(12) United States Patent
Misiak

(10) Patent No.: US 6,734,221 B1
(45) Date of Patent: May 11, 2004

(54) RADIATION-CURABLE, CYANOACRYLATE-CONTAINING COMPOSITIONS

(75) Inventor: Hanns R Misiak, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 145 days.

(21) Appl. No.: 10/088,064

(22) PCT Filed: Sep. 8, 2000

(86) PCT No.: PCT/US00/24620

§ 371 (c)(1),
(2), (4) Date: Mar. 11, 2002

(87) PCT Pub. No.: WO01/18068

PCT Pub. Date: Mar. 15, 2001

(51) Int. Cl.[7] .............................. C09J 4/04; C08F 2/50
(52) U.S. Cl. ........................... 522/16; 522/24; 522/26; 522/28; 522/173
(58) Field of Search .................. 52/16, 24, 26, 52/173, 28

(56) References Cited

U.S. PATENT DOCUMENTS

| | | | |
|---|---|---|---|
| 3,940,362 A | 2/1976 | Overhults | 236/12 |
| 4,139,388 A | 2/1979 | Reich et al. | 96/67 |
| 4,707,432 A | 11/1987 | Gatechair et al. | 430/281 |
| 5,530,037 A | 6/1996 | McDonnell et al. | 522/79 |
| 5,652,280 A | 7/1997 | Kutal | 522/66 |
| 5,691,113 A | 11/1997 | Kutal | 430/274.1 |
| 5,824,180 A | 10/1998 | Mikuni et al. | 156/275.3 |
| 5,877,230 A | 3/1999 | Kutal | 522/66 |
| 5,922,783 A | 7/1999 | Wojciak | 522/18 |

FOREIGN PATENT DOCUMENTS

| | | | |
|---|---|---|---|
| EP | 0 274 595 A2 | 7/1988 | C08F/2/50 |
| EP | 0 393 407 A1 | 10/1990 | C09J/163/00 |
| EP | 0 769 721 A1 | 4/1997 | G03F/7/039 |
| WO | WO 98/38260 | 9/1998 | C09J/4/04 |

OTHER PUBLICATIONS

H.V. Coover, D.W. Dreifus and J.T. O'Connor, "Cyanoacrylate Adhesives" in *Handbook of Adhesives*, 27, 463–77, I Skeist, ed., Van Nostrand Reinhold, New York, 3rd ed. (1990).

J. G. Woods, "Radiation–curable Adhesives" in *Radiation Curing: Science and Technology*, 333–98, 371, S.P. Pappas, ed., Plenum Press, New York (1992).

C. Kutal, P.A. Grutsch and D.B. Yang, "A Novel Strategy for Photoinitiated Anionic Polymerization" *Macromolecules*, 24, 6872–73 (1991).

*Primary Examiner*—Susan Berman
(74) *Attorney, Agent, or Firm*—Steven C. Bauman

(57) ABSTRACT

A radiation-curable composition that includes a cyanoacrylate component or a cyanoacrylate-containing formulation, a photoinitiated radical generating component, and a photoinitiator component is provided.

17 Claims, No Drawings

RADIATION-CURABLE, CYANOACRYLATE-CONTAINING COMPOSITIONS

BACKGROUND OF THE INVENTION

1. Field of the Invention

The present invention relates to radiation-curable compositions, which include a cyanoacrylate component or a cyanoacrylate-containing formulation, a photoinitiated radical generating component and a photoinitiator component.

2. Brief Description of Related Technology

Cyanoacrylates generally are quick setting materials which cure to clear, hard glassy resins, useful as sealants, coatings, and particularly adhesives for bonding together a variety of substrates [see e.g., H. V. Coover, D. W. Dreifus and J. T. O'Connor, "Cyanoacrylate Adhesives" in *Handbook of Adhesives*, 27, 463–77, I. Skeist, ed., Van Nostrand Reinhold, New York, 3rd ed. (1990)].

Ordinarily, upon contact with substrate materials possessing a surface nucleophile, cyanoacrylate-containing compositions spontaneously polymerize to form a cured material. The cured material exhibits excellent adhesive properties to materials such as metals, plastics, elastomers, fabrics, woods, ceramics and the like. Cyanoacrylate-containing compositions are thus seen as a versatile class of single-component, ambient temperature curing adhesives.

With conventional polymerizable compositions other than those containing cyanoacrylate monomers, radiation cure generally presents certain advantages over other known cure methods. Those advantages include reduced cure time, solvent elimination (which thereby reduces environmental pollution, and conserves raw materials and energy) and inducement of low thermal stressing of substrate material. Also, room temperature radiation cure prevents degradation of certain heat sensitive polymers, which may occur during a thermal cure procedure.

Radiation-curable, resin-based compositions are legion for a variety of uses in diverse industries, such as coatings, printing, electronic, medical and general engineering. Commonly, radiation-curable compositions are used for adhesives, and certain of the compositions are acrylate-based compositions.

Well-known examples of radiation-curable, acrylate-based resins include those having structural backbones of urethanes, amides, imides, ethers, hydrocarbons, esters and siloxanes. [See e.g., J. G. Woods, "Radiation-Curable Adhesives" in *Radiation Curing: Science and Technology*, 333–98, 371, S. P. Pappas, ed., Plenum Press, New York (1992).] The common cure mechanism for such radiation-curable, acrylate-based compositions is reported to be free-radical polymerization.

European Patent Publication EP 393 407 describes a radiation-curable composition which includes a slow cure cationic polymerizable epoxide, a fast cure free radical polymerizable acrylic component and a photoinitiator. Upon exposure to radiation, the photoinitiator is said to be capable of generating a cationic species which is capable of initiating polymerization of the epoxide and a free radical species which is capable of initiating polymerization of the acrylic component. The polymerizable acrylic component includes monofunctional acrylates and acrylate esters, such as cyano-functionalized acrylates and acrylate esters, examples of which are expressed as 2-cyanoethyl acrylate ($CH_2$=$CHCOOCH_2CH_2CN$) and 3-cyanopropyl acrylate ($CH_2$=$CHCOOCH_2CH_2CH_2CN$). (See page 5, lines 19–26.)

U.S. Pat. No. 4,707,432 (Gatechair) speaks to a free radical polymerizable composition which includes (a) polymerizable partial esters of epoxy resins and acrylic and/or methacrylic, and partial esters of polyols and acrylic acid and/or methacrylic acid, and (b) a photoinitiator blend of a cyclopentadienyl iron complex and a sensitizer or photoinitiator, such as an acetophenone.

In C. Kutal, P. A. Grutsch and D. B. Yang, "A Novel Strategy for Photoinitiated Anionic Polymerization", *Macromolecules*, 24, 6872–73 (1991), the authors note that ethyl cyanoacrylate is "unaffected by prolonged (24-h) irradiation with light of wavelength >350 nm" whereas in the presence of $NCS^-$, cyanoacrylate is observed to solidify immediately, generating heat in the process. Though the $NCS^-$ was not in that case generated as a result of irradiation, it was generated from the Reineckate anion upon ligand field excitation thereof with near-ultraviolet/visible light. See also U.S. Pat. No. 5,652,280 (Kutal) U.S. Pat. No. 5,691,113 (Kutal) and U. S. Pat. No. 5,877,230 (Kutal).

International Patent Application PCT/US98/03819 describes photocurable compositions including a cyanoacrylate component, a metallocene component and a photoinitiator component.

European Patent Publication No. EP 769 721 A1 describes a photocurable compositions of (a) an α-cyanoacrylate and (b) a metallocene compound comprising a transition metal of group VIII of the periodic table and aromatic electron system ligands selected from π-arenes, indenyl, and η-cyclopentadienyl. The photocurable composition may further include (c) a cleavage-type photoinitiator. U.S. Pat. No. 5,814,180 (Mikuni) describes such compositions in the context of a method of bonding artificial nails.

Although the predominant mechanism by which cyanoacrylate monomers undergo polymerization is an anionic one (which as noted above is typically initiated using a nucleophile), free-radical polymerization is also known to occur. Such free radical polymerization is however seen as troublesome since it tends to reduce shelf-life stability under prolonged exposure to heat or light of an appropriate wavelength. See e.g., Coover et al., supra. Ordinarily, free-radical stabilizers, such as quinones or hindered phenols, are included in cyanoacrylate-containing adhesive compositions to consume free radicals that are generated by light and under typical non-airtight storage conditions, thereby extending the adhesive's shelf life. Thus, the extent of any free-radical polymerization of commercial cyanoacrylate-containing adhesive compositions is especially undesirable for at least the reason stated and in practice is typically minimal due to the inclusion of such free-radical stabilizers.

It is not believed to date that a cyanoacrylate-based adhesive composition has been developed to rapidly cure through a photoinitiated free radical mechanism, while retaining commercially acceptable shelf life stability. Such a composition would be desirable as possessing the benefits and advantages of cyanoacrylate-containing compositions while curing through at least a photo-induced free radical polymerization mechanism.

SUMMARY OF THE INVENTION

The present invention provides compositions which include a cyanoacrylate component or a cyanoacrylate-containing formulation, a photoinitiated radical generating component and a photoinitiator component. Such compositions cure after exposure to radiation in the electromagnetic spectrum.

The photocurable compositions of this invention retain those benefits and advantages of traditional cyanoacrylate-containing compositions while curing through at least a photo-induced free radical polymerization mechanism, thereby providing to the compositions (and cured reaction products formed therefrom) the benefits and advantages of curing through such a mechanism. More specifically, photocurable compositions of this invention cure rapidly when used, and in so doing minimize the opportunity for undesirable blooming or crazing formation in the cured reaction product. In addition, the inventive photocurable compositions are capable of curing through larger gaps between substrate surfaces than conventional cyanoacrylates, or known photocurable cyanoacrylates. Moreover, as set forth in greater detail below, in one aspect of the invention the photocurable compositions include a non-cyanoacrylate-based radical curable component. The precense of such a component in the inventive compositions allows for the generation of copolymers and reaction products, which would not otherwise be accesible through typical anionic polymerization mechsanisms—the predominant polymerization of cyanoacrylates.

In another aspect of the present invention, there is provided a method of polymerizing a photocurable composition by providing an amount of the composition to a desired surface and exposing the composition to radiation in an amount sufficient to effect cure thereof.

In yet another aspect of the present invention, there is provided the cured reaction product formed from a photocurable composition after exposure thereof to a curingly effective amount of radiation.

The present invention will be more readily appreciated by those persons of skill in the art based on a reading of the detailed description of the invention which follows and the examples presented thereafter for illustrative purposes.

DETAILED DESCRIPTION OF THE INVENTION

This invention relates to photocurable compositions, which include a cyanoacrylate component or a cyanoacrylate-containing formulation, a photoiniated radical generating component and a photoinitiator component.

The cyanoacrylate component or cyanoacrylate-containing formulation includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl-2-cyanoacrylates, such as n-propyl- or i-propyl-2-cyanoacrylate, butyl-2-cyanoacrylates, such as n-butyl- or i-butyl-2-cyanoacyrlate, octyl-2-cyanoacrylates, such as n-alkyl-, 2-alkyl-2-cyanoacrylate, and the like, allyl cyanoacrylate, β-methoxyethyl cyanoacrylate and combinations thereof. A particularly desirable cyanoacrylate monomer for use herein is ethyl-2-cyanoacrylate.

Among the different types of materials appropriate for use as the photoiniated radical generating component desirable ones share at least these common features: they possess electron withdrawing substituents present at at least one portion of the molecule, thereby rendering the portion(s) electron deficient. And when placed in contact with a photoexcitable material (such as a dye), which when exposed to radiation of an appropriate wavelength, absorbs energy sufficient to cause the radical initiator to cleave at the electron deficient portion(s) of the molecule, thereby generating free radicals.

A variety of photoiniated radical generating components are suitable for use herein, such as α-haloacetophenones, azo compounds, aromatic carbonyl compounds, peroxides, hydroperoxides, and peresters. Of course, combinations of these compounds may also be used.

More specific examples of such materials include azoisobutyronitrile ("AIBN"), 1,1'-azo-bis(cyclohexane carbonitrile) ("ABCH"), 4,4'-azo-bis(4-cyanovaleric acid) ("ABCV"), 1,1'-(azodicarbonyl)-dipiperidine ("ADCDP"), 1,1-bis(t-butylperoxy)cyclohexane ("BBPH"), 2,5-bis(t-butylperoxy)2,5-dimethylhexane ("BBPDMH"), bis[1-(t-butylperoxy)-1-methyl-ethyl]benzene ("BBPMEB"), benzoin methylether ("BME"), cumylhydroperoxide ("CHPO"), dibenzoylperoxide ("DBPO"), di-t-butylperoxide ("DTBPO"), 2,2-diethoxyacetophenone ("DEAP"), 2,2-dimethoxy-phenylacetophenone ("DMPAP"), dicumylperoxide ("DCPO"), diphenyl(2,4,6-trimethylbenzoyl)-phosphine oxide ("DPTPO"), desylchloride ("DC"), lauroylperoxide ("LPO"), t-butylperoxybenzoate ("TBPB"), and t-butylhydroperoxide ("TBHPO").

Other examples include those available commercially from Ciba Specialty Chemicals Corp., Tarrytown, New York under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4-,4-trimethyl pentyl) phosphine oxide and 2-hydroxy-2-methyl-1-phenyl-propan-1-one), and 819 [bis(2,4,6-trimethyl benzoyl) phenyl phosphine oxide] and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC (bis($\eta^5$-2,4-cyclopentadien-1-yl)-bis[2,6-difluoro-3-(1H-pyrrol-1-yl)phenyl]titanium).

Of course, combinations of these materials may also be employed herein.

Photoinitiators enhance the rapidity of the curing process when the radiation compositions are exposed to electromagnetic radiation. A number of photoinitiators may be employed herein, examples of which include, but are not limited to, Photoinitiators useful herein include pyrylium-based materials having a core structure of

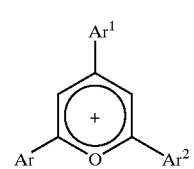

where each of Ar, $Ar^1$ and $Ar^2$ are aryl groups, with or without substitution, and $X^-$ is an anion, such as halogen, hexahalophosphate, hexahaloarsenate, hexahaloantimonate, tetrahaloferrate, tetrahaloborate (e.g., fluoro, chloro, bromo and iodo), and sulfonate.

More specific representations of the pyrylium-based materials include: 2,4,6-triphenylpyrylium-tetrafluoroborate ("TPT"), 1,4-phenylene-4,4'-bis-(2,6-diphenyl-4-pyrylium-tetrafluoroborate) ("PBT"), 2,4-diphenylnaphto-(1,2-B) pyrylium-tetrafluoroborate ("DNT"), 2,4,6-triphenyl-pyrylium trifluoromethane sulfonate ("TPTS"), and 2,6-dipenyl-4(p-tolyl)-pyrylium tetrafluoroborate ("DTPT").

In the aspect of the invention where a non-cyanoacrylate-based radical curable component is included in the inventive compositions, such radical curable component may be selected from a wide variety of materials, such as alkenes or alkynes.

of these, styrene and derivatives thereof, such as alkyl- and alkenyl-ether derivatives, (meth)acrylates, alkyl- and aryl or alkenyl acetylenes, as well as esters of vinyl alcohol (e.g., vinyl acetate), are particularly desirable.

With respect to formulating photocurable compositions, generally the components may be introduced to one another in any convenient order. Alternatively, it may be desirable to prepare a premix of the radical initiator component and the photoinitiator component. In this way, a ready made premix of those components may be added to the cyanoacrylate component of the formulation to allow for a quick and easy one-part formulation of a photocurable composition prior to dispensing and curing thereof.

For packaging and dispensing purposes, it may be desirable for photocurable compositions in accordance with the present invention to be relatively fluid and flowable. Variations in the viscosity thereof may also be desirable in certain applications and may be readily achieved through routine changes in formulation, the precise changes being left to those persons of ordinary skill in the art.

For instance, ordinarily cyanoacrylate-containing compositions free from an added thickener or viscosity modifier are low viscosity formulations (such as in the range of 1 to 3 cps). While a composition with such a viscosity (or one whose viscosity has been modified to be up to about five times that viscosity) may be appropriate for a wicking application where a small gap exists between sustrates to be bound (e.g., less than about 0.1 mils) and/or an application where enhanced cure speed is desirable, such a viscosity may be too low for convenient use in certain industrial applications. At least for this reason, the viscosity of cyanoacrylate-containing compositions has at times been desirably modified through, for instance, the addition of polymethylmethacrylates and/or fumed silicas. See e.g., U.S. Pat. No. 4,533,422 (Litke) and U. S. Pat. No. Re. 32,889 (Litke), the disclosures of each of which are hereby expressly incorporated herein by reference.

A medium viscosity formulation (such as in the range of 100 to 300 cps) may be more appropriate in applications where greater control of flowability is desirable. And a high viscosity formulation (such as in the range of 600 to 1000 cps) may be more appropriate in applications involving porous substrates and/or substrates with larger gaps (such as greater than about 0.5 mils).

Of course, those persons of skill in the art should make appropriate decisions regarding whether a viscosity modifier should be included in the photocurable composition, and if so which one(s) and at what level should one be included to achieve the desired viscosity for the intended applications.

In addition, it may be desirable to toughen the cured photocurable compositions of the present invention through the addition of elastomeric rubbers such as is taught by and claimed in U.S. Pat. No. 4,440,910 (O'Connor), the disclosure of which is hereby expressly incorporated herein by reference. It may also be desirable to improve the hot strength of the cured photocurable compositions by addition of anhydrides, such as is taught by and claimed in U.S. Pat. No. 4,450,265 (Harris) and the documents cited therein, the disclosures of each of which are hereby expressly incorporated herein by reference.

Moreover, the compositions of the present invention may be rendered into a thixotropic paste through addition of powdered organic fillers having a particle size of about 2 to 200 microns as is taught by U.S. Pat. No. 4,105,715 (Gleave) or thickened by a copolymer or terpolymer resin to improve peel strength as is taught by U.S. Pat. No. 4,102,945 (Gleave), the disclosures of each of which are hereby incorporated herein by reference.

Further, the compositions of the present invention may be rendered more resistant to thermal degradation at elevated temperature conditions by the inclusion of certain sulfur-containing compounds, such as sulfonates, sulfinates, sulfates, sultones and sulfites as set forth in U.S. Pat. No. 5,328,944 (Attarwala), the disclosure of which is hereby expressly incorporated herein by reference. The inclusion of such compounds in the photocurable compositions of the present invention renders those compositions well-suited for applications in which elevated temperature conditions may be experienced, such as with potting compounds particularly where large cure through volume is present and non-tacky surfaces are desirably formed in less than about five seconds.

The inclusion of such materials to a photocurable composition in accordance with the present invention may provide a formulation having particular advantages for certain applications, and should be appealing from a safety perspective as the possibility is decreased of splashing or spilling the composition on exposed skin of the user or bystanders.

Another desirable component to include in the inventive compositions is a photosensitizer to render the composition more reactive toward exposure to electromagnetic radiation. Desirable examples of such photosensitizers include benzophenone or dyes like xanthene dyes, acridinium dyes or phenazine dyes. Inclusion of such photosensitizers often lessens the intensity and/or duration of exposure to the electromagnetic radiation used to initiate cure.

The relative amount of the various components of the photocurable compositions according to this invention is a matter of choice left to those persons of skill in the art, depending of course on the identity of the particular components chosen for a specific composition.

As a general guide, however, it is desirable to include in the photocurable compositions a photoiniated radical generating component, such as peroxide, perester, azo compounds, benzoin derivatives (e.g., DMPAP), α-halo acetophenones (e.g., DC), acylphosphine oxides (e.g., DPTPO or related phospine oxide compounds), in an amount within the range of about 0.005% to about 4% or greater (desirably within the range of about 0.01% to about 1.5%) by weight of the total composition. It is also desirable for the compositions to include a photoinitiator component, such as substituted pyrylium salts or anthracene and derivatives thereof, e.g., substituted anthracenes, or anthraquinone or ketocoumarine derivatives, in an amount within the range of about 0.5% to about 10% by weight of the composition, with about 2% to about 4% or greater by weight of the total composition being desirable. The balance of the composition is composed predominantly of a cyanoacrylate component, such as ethyl-2-cyanoacrylate. Of course, the amount of all the components—including stabilizers—together in the composition totals 100%.

A method of curing a photocurable composition in accordance with this invention is also provided herein, the steps of which include (a) providing onto a desired surface an amount of a photocurable composition; and (b) subjecting the composition to radiation sufficient to effect cure thereof.

The amount of photocurable composition provided should be sufficient to cure and form an adequate bond to the substrate surfaces between which it is applied. For instance, application of the photocurable composition may be achieved by dispensing the composition in drop-wise fashion, or as a liquid stream, brush-applied, dipping, and the like, to form a thin film. Application of the photbcurable composition may depend on the flowability or viscosity of the composition. To that end, viscosity modifiers, as noted above, may be included in the composition.

The photocurable compositions of the present invention have taken the ordinary undesirable by-product free radical reaction that compromises shelf life stability and turned it into a controlled free radical cure mechanism.

In use, such compositions are desirably readily dispensed onto a portion of a desired surface of a substrate onto which is to be bonded a portion of another substrate. The photocurable composition may be applied to certain portions of the substrate surface or over the entire surface of the substrate to be bonded, depending on the particular application.

The source of radiation emitting electromagnetic waves is selected from ultraviolet light, visible light, electron beam, x-rays, infrared radiation and combinations thereof. Desirably, ultraviolet light is the radiation of choice, with appropriate sources including "H", "D", "V", "X", "M" and "A" lamps, mercury arc lamps, and xenon arc lamps (such as those commercially available from Loctite Corporation, Rocky Hill, Conn. Fusion UV Curing Systems, Buffalo Grove, Ill.; Spectroline, Westbury, N.Y.; or Xenon Corp., Woburn, Mass.; microwave-generated ultraviolet radiation; solar power and fluorescent light sources. Any of these electromagnetic radiation sources may use in conjunction therewith reflectors and/or filters, so as to focus the emitted radiation onto a specific portion of a substrate onto which has been dispensed a photocurable composition and/or within a particular region of the electromagnetic spectrum. Similarly, the electromagnetic radiation may be generated directly in a steady fashion or in an intermittent fashion so as to minimize the degree of heat build-up. Although the electromagnetic radiation employed to cure the photocurable compositions into desired reaction products is often referred to herein as being in the ultraviolet region, that is not to say that radiation in other regions within the electromagnetic spectrum may not also be suitable. For instance, in certain situations, radiation in the visible region of the electromagnetic spectrum may also be advantageously employed, whether alone or in combination with, for instance, radiation in the ultraviolet region. Of course, microwave and infrared radiation may also be advantageously employed under appropriate conditions.

Higher or lower radiation intensities, greater or fewer exposures thereto and length of exposure and/or greater or lesser distances of the source of radiation to the composition may be required to complete curing, depending of course on the particular components of a chosen composition.

More specifically with respect to radiation intensity, the chosen lamp should have a power rating of at least about 100 watts per inch (about 40 watts per cm), with a power rating of at least about 300 watts per inch (about 120 watts per cm) being particularly desirable. Also, since the inclusion of a photoinitiator in the composition may shift the wavelength within the electromagnetic radiation spectrum at which cure occurs, it may be desirable to use a source of electromagnetic radiation whose variables (e.g., wavelength, distance, and the like) are readily adjustable.

During the curing process, the composition will be exposed to a source of electromagnetic radiation that emits an amount of energy, measured in $mW/cm^2$, determined by parameters including: the size, type and geometry of the source; the duration of the exposure to electromagnetic radiation; the intensity of the radiation (and that portion of radiation emitted within the region appropriate to effect curing); the absorbency of electromagnetic radiation by any intervening materials, such as substrates; and the distance the composition lies from the source of radiation. Those persons of skill in the art should readily appreciate that curing of the composition may be optimized by choosing appropriate values for these parameters in view of the particular components of the composition.

To effect cure, the source of electromagnetic radiation may remain stationary while the composition passes through its path. Alternatively, a substrate coated with the photocurable composition may remain stationary while the source of electromagnetic radiation passes thereover or thearound to complete the transformation from composition to reaction product. Still alternatively, both may traverse one another, or for that matter remain stationary, provided that the photocurable composition is exposed to electromagnetic radiation sufficient to effect cure.

Commercially available curing systems, such as the "ZETA" 7200 or 7400 ultraviolet curing chamber (Loctite Corporation, Rocky Hill, Conn.), "UVALOC" 1000 (Loctite Deutschland GmbH, München, Germany), Fusion UV Curing Systems F-300 B (Fusion UV Curing Systems, Buffalo Grove, Ill.), Hanovia UV Curing System (Hanovia Corp, Newark, N.J.), BlackLight Model B-100 (Spectroline, Westbury, N.Y.), and RC500 A Pulsed UV Curing System (Xenon Corp., Woburn, Mass.), are well-suited for the purposes described herein. Also, a Sunlighter UV chamber fitted with low intensity mercury vapor lamps and a turntable may be employed herein.

The required amount of energy may be delivered by exposing the composition to a less powerful intensity of electromagnetic radiation for a longer period of time, through for example multiple passes, or alternatively, by exposing the composition to a more powerful intensity of electromagnetic radiation for a shorter period of time. In addition, each of those multiple passes may occur with an intensity at different energy intensities. In any event, those persons of skill in the art should choose an appropriate intensity of electromagnetic radiation depending on the particular composition, and position the source of electronic radiation at a suitable distance therefrom which, together with the length of exposure, optimizes transformation. Also, it may be desirable to use a source of electromagnetic radiation that is delivered in an intermittent fashion, such as by pulsing or strobing, so as to ensure a thorough and complete cure without causing excessive heat build-up.

In use, a photocurable composition in accordance with the present invention may be dispensed, such as in the form of a thin film or droplet, onto a desired substrate. Substrates onto which the photocurable composition of the present invention may be applied may be chosen from a vast selection of different materials; basically, any material with which cyanoacrylates may be used is suitable as well for use herein. See supra.

Desirable choices among such materials include acrylics, epoxies, polyolefins, polycarbonates, polysulfones (e.g., polyether sulfone), polyvinyl acetates, polyamides, polyetherimides, polyimides and derivatives and co-polymers thereof with which may be blended or compounded traditional additives for aiding processibility or modifying the physical properties and characteristics of the material to be used as a substrate. Examples of co-polymers which may be employed as substrates include acrylonitrile-butadiene-styrene, styrene-acrylonitrile cellulose, aromatic copolyesters based on terephthallic acid, p,p-dihydroxybiphenyl and p-hydroxy benzoic acid, polyalkylene (such as polybutylene or polyethylene) terephthalate, polymethyl pentene, polyphenylene oxide or sulfide, polystyrene, polyurethane, polyvinylchloride, and the like. Of course, other materials may also be employed for use herein. Particularly, desirable co-polymers include those which are capable of transmitting UV and/or visible radiation.

The composition-coated substrate may be positioned within an electromagnetic radiation curing apparatus, such as the "ZETA" 7200 ultraviolet curing chamber or the "UVALOC" 1000 ultraviolet curing chamber, equipped with an appropriate source of electromagnetic radiation, such as ultraviolet radiation, at an appropriate distance therefrom, such as within the range of about 1 to 2 inches, with about 3 inches being desirable. As noted above, the composition-coated substrate may remain in position or may be passed thereunder at an appropriate rate, such as within the range of about 1 to about 60 seconds per foot, with about 5 seconds per foot. Such passage may occur one or more times, or as needed to effect cure of the composition on the substrate. The length of exposure may be in the range of a few seconds or less (for one time exposure) to tens of seconds or longer (for either a one time exposure or a multiple pass exposure) if desired, depending on the depth of the composition to be cured and of course on the components of the composition themselves.

A reaction product is also of course provided by the teaching of this invention. The reaction product is formed from photocurable compositions after exposure thereof to electromagnetic radiation sufficient to effect cure of the composition. The reaction product is formed rapidly, and ordinarily and desirably without observed formation of blooming or crazing, see infra.

The reaction product of the photocurable composition may be prepared by dispensing in low viscosity or liquid form a photocurable composition in accordance with present invention onto a substrate and mating that substrate with a second substrate to form an assembly. Thereafter, exposure to electromagnetic radiation on at least one substrate of the assembly for an appropriate period of time should transform the photocurable composition into an adhesive reaction product.

It is also within the scope of the present invention for reaction products to be prepared from a photocurable composition separately from the device, and thereafter positioned on a substrate surface with which it is to be used.

The viscosity of the photocurable composition may be controlled or modified to optimize its dispensability by, in addition to inclusion of an appropriate material to alter the viscosity thereof as noted above, adjusting the temperature of (1) the composition itself, or (2) the substrates on which the composition may be placed to assemble the device. For example, the temperature of the composition or the substrate (s) or combinations thereof may be decreased to increase the viscosity of the composition. In this way, the uniformity on the substrate of the dispensed photocurable composition may be enhanced using lamination techniques, centrifuge techniques, pressure applied from the atmosphere (such as with vacuum bagging), pressure applied from a weighted object, rollers and the like.

The substrates onto which the photocurable compositions of the present invention are intended to be dispensed may be constructed from the litany of materials recited supra, which may be substantially inflexible as well as flexible. The type of substrate chosen with respect to flexibility will of course depend on the application for which it is to be used. More specifically, the substrates may be constructed from substantially inflexible materials, such as glass, laminated glass, tempered glass, optical plastics, such as polycarbonates, acrylics and polystyrenes, and other alternatives as noted supra; and flexible materials, such as "MYLAR" film or polyolefin, such as polyethylene or polypropylene, tubing.

The choice of substrate material may influence the choice of processing technique used to prepare the photocurable composition into the cured reaction product or the type of device assembled. For example, when assembling a device from at least one flexible substrate, a composition may be advantageously applied to an end portion of the flexible substrate and allowed to wick along that end portion through a portion of another substrate, which is dimensioned to receive that end portion of the flexible substrate. A particular example of such an application is polyolefin tubing intended for medical applications, one end portion of which is dimensioned for receiving by an acrylic luer housing.

Since the photocurable compositions of the present invention cure to form reaction products through a photo-initiated free radical mechanism, the composition is exposed to the source of electromagnetic radiation to effect cure. The choice of substrate may affect the rate and degree at which cure occurs of the photocurable compositions of the present invention. For instance, it is desirable for the substrates to be bonded together to be substantially free of electromagnetic radiation-absorbing capabilities. That is, the greater degree of electromagnetic radiation transmitting capability the substrate possesses, the greater the rate and degree of cure of the composition, all else being equal of course.

It may be desirable to package the inventive compositions in a two part package, particularly in those instances where a cyanoacrylate component and a non-cyanoacrylate radical curable component are present.

Blooming or crazing may be observed when compositions cure into reaction products and the cure itself is incomplete. That is, blooming refers to the evaporation of cyanoacrylate monomer (due to its relatively high vapor pressure) from uncured fillets, the result of which is formation of a precipitate on surfaces adjacent to the bond line which are also observed as a white haze. Crazing refers to the formation of stress cracks on certain synthetic materials, such as polycarbonates, acrylics and polysulfones, due in this instance to the presence thereon of cyanoacrylate monomer.

The result of incomplete curing may be observed with respect to adhesive uses of the photocurable composition as adhesive or cohesive failure of the cured composition when applied to or between substrates. Such observations may be minimized or even eliminated by using electromagnetic radiation transmitting (as contrasted to absorbing) substrates and placing the source of electromagnetic radiation at a strategic location so as to improve the degree of electromagnetic radiation to which the composition on the substrate is exposed. Similarly, additional sources of electromagnetic radiation, or as stated above reflectors which redirect onto desired portions of the substrate stray or errant electromagnetic radiation, may be employed to further enhance cure.

The compositions of the present invention minimize and often eliminate blooming and crazing in commercial applications of the compositions by curing through the photoinitiated mechanism.

In addition, the compositions of this invention provide a built-in secondary cure system (i.e., photoinitiated free radical initial in addition to the ordinary cyanoacrylate anionic initiation), which is particularly attractive in those applications where certain of the substrates which may be used in the assembly do not allow the transmission of light, rendering another type of adhesive (such as a dual cure acrylic adhesive) less desirable because a secondary heating step would then be required; elimination of a substrate primer step, which obviates the use of often flammable materials and invites automated processes; and improved cure through volume capabilities.

In view of the above description of the present invention, it is evident that a wide range of practical opportunities is provided by the teaching herein. Certain of those practical opportunities are exemplified below, as are many of the advantages and benefits of the present invention. However, the invention as so exemplified is for illustrative purposes only and is not to be construed in any way as limiting the broad aspects of the teaching herein provided.

EXAMPLES

Example 1

In this example, formulations were prepared to demonstrate the effect of one or the other of a radical initiator component and a photoinitiator component in ether to cyanoacrylate composition. The photoinitiated radical generating component chosen was dibenzoyl peroxide ("DBPO") and the photoinitiator component was 2,4,6-triphenylpyrylium tetraflouroborate ("TPT"). The formulations were prepared by mixing the appropriate components with the cyanoacrylate and thereafter dispensing a drop of the formulation onto a polycarbonate slide. The slide was then exposed to 1000 watts of mercury arc light in a "UVALOC" 1000 irradiation chamber for a period of time of about 30 seconds. The results of this example are shown below in Table 1.

TABLE 1

| Sample No. | DBPO [ppm] | TPT [ppm] | After Exposure to 1000 W light [30 secs] |
|---|---|---|---|
| 1 | 0 | 1000 | No curing |
| 2 | 100 | 0 | No curing |
| 3 | 500 | 0 | No curing |
| 4 | 2500 | 0 | NO curing |
| 5 | 10000 | 0 | No curing |
| 6 | 100 | 100 | High viscous |
| 7 | 100 | 1000 | Tack-free curing |
| 8 | 500 | 100 | High viscous |
| 9 | 500 | 1000 | Tack-free curing |
| 10 | 2500 | 100 | High viscous |
| 11 | 2500 | 1000 | Cured |
| 12 | 10000 | 100 | High viscous |
| 13 | 10000 | 1000 | High viscous |

The information shown in Table 1 indicates that the combination of the radical initiator component and the photoinitiator component (see Sample Nos. 6–13) enables the cyanoacrylate to cure when exposed to UV light, whereas when only one or the other of the radical initiator component or photoinitiator component are present (see Sample Nos. 1–5), no curing of the cyanoacrylate occurs. It may also be seen that vast amounts of the photoinitiated radical generating component is not necessary to observe the behavior of the inventive compositions (see Sample Nos. 6–9).

Example 2

In this example, a variety of radical initiator components were used in the formulation.

Again starting with ethyl-2-cyanoacrylate, and keeping the phtoinitiator component constant as "TPT", a variety of different radical initiator components were used in the amounts noted to determine whether and to what extent the so-prepared formulations would cure when exposed to UV light. Table 2 below sets forth the specific identity and amounts of the radical initiator components used in the samples. Table 2 also sets forth the curing speed attained in seconds when one drop of the sample was placed on a glass slide (from Smiths Glassware) and exposed to 1000 W of mercury arc light and/or when one drop of the sample was placed on a glass slide and a second glass slide was positioned thereover, and thereafter exposing the single or double glass slide assembly to a Philips lamp HPR125 at 6 mW/cm$^2$ intensity or to no extra light at all.

TABLE 2

| | | | | Curing Speed [secs] | | |
|---|---|---|---|---|---|---|
| | | Radical | | | 2 glass slides | |
| Sample No. | TPT [ppm] | Initiator Type | [ppm] | 1000 W 1 glass slide | 6 mW/ cm$^2$ | No light |
| 14 | 2000 | DBPO | 100 | 29 | 2 | >50 |
| 15 | 2000 | DBPO | 150 | 28 | 2 | >50 |
| 16 | 2000 | DBPO | 250 | 29 | 2 | >50 |
| 17 | 2000 | DBPO | 350 | 31 | 1–2 | >50 |
| 18 | 2000 | DBPO | 450 | 31 | 1–2 | >50 |
| 19 | 2000 | DBPO | 600 | 34 | 1–2 | >50 |
| 20 | 2000 | DBPO | 1000 | 35 | | |
| 21 | 2000 | DBPO | 5000 | 35 | | |
| 22 | 2000 | TBPB | 600 | 35 | | |
| 23 | 2000 | TBPB | 1000 | 35 | | |
| 24 | 2000 | TBPB | 5000 | 35 | | |
| 25 | 2000 | DTBPO | 400 | 35 | | |
| 26 | 2000 | DTBPO | 1000 | 35 | | |
| 27 | 2000 | DTBPO | 5000 | 35 | | |
| 28 | 2000 | DEAP | 200 | 40 | | |
| 29 | 2000 | DEAP | 1000 | 30 | | |
| 30 | 2000 | DEAP | 5000 | 35 | | |
| 31 | 2000 | DMPAP | 200 | 35 | | |
| 32 | 2000 | DMPAP | 1000 | 30 | | |
| 33 | 2000 | DMPAP | 5000 | 30 | | |
| 34 | 2000 | ABCH | 400 | 33 | | |
| 35 | 2000 | ABCH | 2000 | 40 | | |
| 36 | 2000 | BBPH | 400 | 40 | | |
| 37 | 2000 | AIBN | 100 | 31 | 1 | >50 |
| 38 | 2000 | AIBN | 200 | 31 | 1–2 | >50 |
| 39 | 2000 | AIBN | 400 | 29 | 1–2 | >50 |
| 40 | 2000 | AIBN | 800 | 30 | 1–2 | >50 |
| 41 | 2000 | AIBN | 2000 | 30 | 2 | >50 |
| 42 | 2000 | AIBN | 4000 | 31 | 2–3 | >50 |
| 43 | 4000 | AIBN | 2000 | 33 | | |
| 44 | 4000 | AIBN | 4000 | 35 | | |
| 45 | 2000 | DCPO | 200 | 40 | | |
| 46 | 2000 | DCPO | 1000 | 35 | | |
| 47 | 2000 | DCPO | 5000 | 40 | | |
| 48 | 2000 | ABCV | 400 | 55 | | |
| 49 | 2000 | ABCV | 2000 | 55 | | |
| 50 | 2000 | TBHPO | 400 | 50 | | |
| 51 | 2000 | TBHPO | 2000 | 45 | | |
| 52 | 2000 | BBPDMH | 400 | 38 | | |
| 53 | 2000 | BBPDMH | 2000 | 38 | | |
| 54 | 2000 | BBPDMH | 400 | 35 | | |
| 55 | 2000 | BBPDMH | 2000 | 40 | | |
| 56 | 2000 | ADCDP | 400 | 22 | | |
| 57 | 2000 | ADCDP | 2000 | 15 | | |
| 58 | 2000 | LPO | 4000 | 30 | | |
| 59 | 2000 | LPO | 2000 | 32 | | |
| 60 | 2000 | DPTPO | 400 | 35 | | |

TABLE 2-continued

| | | Radical | | Curing Speed [secs] | | |
|---|---|---|---|---|---|---|
| | | | | 1000 W | 2 glass slides | |
| Sample No. | TPT [ppm] | Initiator Type | [ppm] | 1 glass slide | 6 mW/cm² | No light |
| 61 | 2000 | DPTPO | 2000 | 22 | | |
| 62 | 2000 | DC | 400 | 45 | | |
| 63 | 2000 | DC | 2000 | 55 | | |
| 64 | 2000 | CHPO | 400 | 50 | | |

Table 2 shows that a variety of photoinitiated radical generating components may be used to render a cyanoacrylate-containing formulation photocurable in the presence of a photoinitiator—in this case TPT. Such photoinitiated radical generating components include, in addition to DBPO, other peroxides, peresters, azo-compounds, halo acetophenones (e.g., DC), aromatic carbonyl compounds (e.g., DMPAP and DEAP), acyl phosphine oxides (e.g., DPTPO) and related compounds.

Example 3

In this example, a variety of different photoinitiator components were chosen for evaluation in an ethyl-2-cyanoacrylate formulation with DBPO as a phtoinitiated radical generating component, with one exception being AIBN in Sample No. 74. The specific photoinitiator components chosen and the amounts used are set forth below in Table 3, as well are the curing speeds of the formulations.

Example 4

In this example, a side-by-side evaluation of a cyanoacrylate composition (one with TPT at a 2000 ppm level and DBPO at a 200 ppm level) curing in the presence of air and in the presence of a nitrogen atmosphere demonstrated that the presence of oxygen inhibits the ability of the composition to cure.

In addition, cyanoacrylate compositions with TPT as a photoinitiator component at 1500 ppm and varied levels of DBPO as a radical initiator component, where the amount was varied, were cured to illustrate that these compositions cure through a free radical initiated mechanism.

In Table 4a below, the effect is shown of increasing the level of DBPO on the cure speed of a composition (Sample No. 65) on a polycarbonate slide when exposed to mercury arc light at an intensity of 1000 W. Increasing the level of DBPO shows an increase in the time required to achieve a tack free surface from the formulation.

An optimum concentration for the photoinitiated radical generating component may indicate the radical nature of the photocuring effect. That is, at a low concentration, the decay of the photoinitiated radical generating component, e.g., DBPO, triggers the growth of macroradicals; at a higher concentration a part of the DBPO may also quench chain propagation.

TABLE 3

| | Radical Initiator | | Photoinitiator | | Curing Speed [secs] | | |
|---|---|---|---|---|---|---|---|
| | | | | | 1000 W | 2 glass slides | |
| Sample No. | Type | [ppm] | Type | [ppm] | 1 slide glass | 6 mW/cm² | No light |
| 65 | DBPO | 100 | TPT | 2000 | 29 | 2 | >50 |
| 66 | DBPO | 150 | TPT | 2000 | 28 | 2 | >50 |
| 67 | DBPO | 250 | TPT | 2000 | 29 | 2 | >50 |
| 68 | DBPO | 350 | TPT | 2000 | 31 | 1–2 | >50 |
| 69 | DBPO | 200 | PBT | 2000 | | 25 | >50 |
| 70 | DBPO | 200 | DNT | 2000 | | 1 | 10 |
| 71 | DBPO | 200 | DNT | 5000 | 45 | 1–2 | 40 |
| 72 | DBPO | 200 | TPTS | 2000 | | 4 | 45 |
| 73 | DBPO | 200 | TPTS | 5000 | 40 | 2 | >50 |
| 74 | AIBN | 500 | DTPT | 2000 | 30 | 2 | >50 |
| 75 | DBPO | 250 | DTPT | 2000 | 35 | 2 | >50 |
| 76 | DBPO | 250 | | | >60 | >30 | >30 |
| 77 | DBPO | 200 | CPPP | 2000 | >50 | | |
| 78 | DBPO | 200 | CPPP | 3000 | >50 | >50 | >50 |
| 79 | DBPO | 200 | DMPT | 2000 | >50 | >50 | |
| 80 | DBPO | 200 | DMPPC | 2000 | | 35 | |
| 81 | DBPO | 200 | DMPPC | 5000 | 40 | 20 | 20 |
| 82 | DBPO | 200 | BHNT | 2000 | | >50 | |
| 83 | DBPO | 200 | BHNT | 3000 | 40 | 45 | |
| 84 | DBPO | 200 | DFPT | 2000 | | >50 | |
| 85 | DBPO | 200 | DFPT | 5000 | 40 | >50 | |
| 86 | DBPO | 250 | CBMOC | 2000 | >60 | >50 | >50 |
| 87 | DBPO | 250 | ADCN | 2000 | >60 | >50 | >50 |

TABLE 4a

| DBPO [ppm] | Cure speed @ 1000 W [secs] |
|---|---|
| 100 | 30 |
| 200 | 25 |
| 300 | 20 |
| 400 | 30 |
| 800 | 45 |

In Table 4b below, a composition within the scope of this invention (Sample No. 88) was prepared and evaluated for tack free time. A composition having the same radical initiator component and the same photoinitiator component in the same amounts (Sample No. 89) was also prepared, to which was added 2000 ppm of hydroquinone. Hydroquione is a known free radical scavenger. In the table it may be seen that the introduction of the hdroquinone vastly retards, if not completely impedes within a reasonable time period, the ability of the composition to cure when exposed to UV light. This data indicates that the inventive compositions cure through a radical initiated mechanism.

TABLE 4b

| Sample No. | DBPO [ppm] | TPT [ppm] | Tack-free time @ 1000 W [secs] |
|---|---|---|---|
| 88 | 200 | 2000 | 26 |
| 89 | 200 | 2000 | >60 |

Example 5

In this example, a non-cyanoacrylate radical curable component was included with the cyanoacrylate to illustrate the ability of the so-formed formulations to cure when exposed to appropriate radiation in the electromagnetic spectrum. The identity of such components, the percent by weight added and the speed of cure are set forth below in Table 5.

TABLE 5

| Sample No. | Non-Cyanoacrylate Radical Curable Component | | Curing speed [secs] |
|---|---|---|---|
| | Type | Amt [%] | |
| 90 | — | — | 6 |
| 91 | Styrene | 25 | 6 |
| 92 | Styrene | 50 | 8 |
| 93 | Styrene | 75 | 16 |
| 94 | Tetrahydrofurfuryl methacrylate | 25 | 40 |
| 95 | Tetrahydrofurfuryl methacrylate | 50 | 32 |
| 96 | Isodecyl methacrylate | 25 | 15 |
| 97 | Phenylacetylene | 50 | 18 |
| 99 | 2-Phenylethyl methacrylate | 50 | 34 |
| 99 | Trimethylphenyl acrylate | 50 | 36 |
| 100 | Pentaerythritol tetraacrylate | 50 | 12 |

Example 6

In this example, a variety of photoinitiated radical generating components were added to ethyl-2-cyanoacrylate in various amounts, with and without 2500 ppm of TPT as a photoinitiator, to determine the cure speed after exposure to UV light at an intensity of 1000 W in an irradiation chamber ("UVALOC 1000", Loctite Deutschland GmbH).

More specifically, Sample Nos. 102, 104, 106, 108, 110, 112, 114, 116, 118, and 120 contained TPT.

TABLE 6

| | Photoinitiated Radical Generating Component | | | | | |
|---|---|---|---|---|---|---|
| Sample No. | AIBN | LUCIRIN TPO | IRGA-CURE 184 | IRGA-CURE 651 | IRGACURE 907 | Curing Time [secs] |
| 101 | 500 | | | | | >60 |
| 102 | 500 | | | | | 34 |
| 103 | 20000 | | | | | * |
| 104 | 20000 | | | | | 42 |
| 105 | | 1500 | | | | * |
| 106 | | 1500 | | | | 26 |
| 107 | | 20000 | | | | * |
| 108 | | 20000 | | | | 13 |
| 109 | | | 1500 | | | * |
| 110 | | | 1500 | | | 45 |
| 111 | | | 20000 | | | * |
| 112 | | | 20000 | | | >60 |
| 113 | | | | 1500 | | * |
| 114 | | | | 1500 | | 50 |
| 115 | | | | 20000 | | * |
| 116 | | | | 20000 | | >60 |
| 117 | | | | | 1500 | >60 |
| 118 | | | | | 1500 | 4 |
| 119 | | | | | 20000 | 15 |
| 120 | | | | | 20000 | 3 |

* No Curing observed; sample evaporates before curing.

While the present invention has been exemplified as shown above, it is clear that variations are also intended to be within the spirit and scope of the present invention and may be practiced in accordance herewith, with only routine, rather than undue, experimentation. Any variations and equivalents should provide suitable, if not comparable results, when viewed in connection with the results obtained from the above examples. Accordingly, such variations and equivalents are also intended to be encompassed by the claims.

What is claimed is:

1. A photocurable composition comprising:
    (a) a 2-cyanoacrylate component,
    (b) a photoinitiated radical generating component, and
    (c) a photoinitiator component other than the photoinitiated radical generating component, wherein the photoinitiator component is embodied by the following structure:

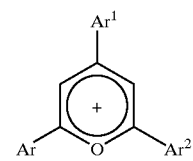

wherein each of Ar, $Ar^1$ and $Ar^2$ are aryl groups, with or without substitution, and $X^-$ is an anion.

2. The composition according to claim 1, wherein the cyanoacrylate component includes a cyanoacrylate monomer represented by $H_2C=C(CN)-COOR$, wherein R is selected from the group consisting of $C_{1-15}$ alkyl, alkoxyalkyl, cycloalkyl, alkenyl, aralkyl, aryl, allyl and haloalkyl groups.

3. The composition according to claim 2, wherein the cyanoacrylate monomer is selected from the group consisting of methyl cyanoacrylates, ethyl-2-cyanoacrylate, propyl-2-cyanoacrylates, butyl-2-cyanoacrylates, octyl-2-cyanoacrylates, allyl cyanoacrylate, β-methoxyethyl cyanoacrylates, and combinations thereof.

4. The composition according to claim 2, wherein the cyanoacrylate monomer is ethyl-2-cyanoacrylate.

5. The composition according to claim 1, wherein the photoinitiated radical generating component is selected from the group consisting of ∝-haloacetophenones, azo compounds, aromatic carbonyl compounds, peroxides, hydroperoxides, peresters, azoisobutyronitrile, and combinations thereof.

6. The composition according to claim 1, wherein the photoinitiated radical generating component is selected from the group consisting of 1,1'-azo-bis(cyclohexanecarbonitrile), 4,4'-azo-bis(4-cyanovaleric acid), 1,1'-(azodicarbonyl)-dipiperidine, 1,1-bis(t-butylperoxy)cyclohexane, 2,5-bis(t-butylperoxy)-2,4-dimethylhexane, bis[1-(t-butylperoxy)-1-methyl-ethyl] benzene, benzoin methylether, cumylhydroperoxide, dibenzoylperoxide, di-t-butylperoxide, 2,2-diethoxyacetophenone, 2,2-dimethoxy-phenylacetophenone, dicumylperoxide, diphenyl(2,4,6-trimethylbenzoyl)-phosphine oxide, desylchloride, lauroylperoxide, t-butylperoxybenzoate, t-butylhydroperoxide and combinations thereof.

7. The composition according to claim 1, wherein the photoinitiated radical generating component is selected from the group consisting of 1-hydroxycyclohexyl phenyl ketone, 2-methyl-1-[4-(methylthio)phenyl]-2-morpholino propan-1-one, benzophenone, 2-benzyl-2-N,N'-dimethylamino-1-(4-morpholinophenyl)-1-butanone, 2,2-dimethoxy-2-phenyl acetophenone, bis(2,6-dimethoxybenzoyl-2,4-trimethyl pentyl phosphine oxide, 2-hydroxy-2-methyl-1-phenyl-propan-1-one, 2,4,6-trimethylbenzoyldiphenyl-phosphine oxide, 2-hydroxy 2-methyl-1-phenyl-propan-1-one, and combinations thereof.

8. The composition according to claim 1, wherein the photoinitiator component is selected from the group consisting of 2,4,6-triphenylpyrylium tetrafluoroborate, 1,4-phenylene-4,4'-bis-(2,6-diphenyl-4-pyrylium tetrafluoroborate), 2,4-diphenylnaphto-(1,2-B) pyrylium tetrafluoroborate, 2,4,6-triphenyl-pyrylium trifluoromethane sulfonate, 2,6-diphenyl-4(p-tolyl)-pyrylium tetrafluoroborate and combinations thereof.

9. The composition according to claim 1, further comprising (d) a non-cyanoacrylate radical curable component.

10. The composition according to claim 9, wherein the non-cyanoacrylate radical curable component is a member selected from the group consisting of styrenes, (meth) acrylates, and combinations thereof.

11. The composition according to claim 1, wherein radiation in the electromagnetic spectrums appropriate for photocuring the composition is selected from the group consisting of ultraviolet light, visible light, electron beam, x-rays, infrared radiation and combinations thereof.

12. The composition according to claim 1, further comprising a member selected from the group consisting of viscosity-modifying agents, rubber toughening agents, thixotropy conferring agents, thermal-stabilizing agents, and combinations thereof.

13. The composition according to claim 1, wherein the composition is useful as an adhesive, a sealant or a coating.

14. The composition according to claim 1 in a two-part formulation.

15. The composition according to claim 1 in a one-part formulation.

16. The composition according to claim 1, for use in the manufacture of articles having porous substrates and/or substrates with gaps greater than about 0.5 mils therebetween.

17. A method of polymerizing a photocurable composition, said method comprising the steps of:

(a) providing an amount of the photocurable composition according to claim 1; and (b) subjecting the composition to radiation in the electromagnetic spectrum effective to cure the composition.

* * * * *